United States Patent [19]
Dempsey et al.

[11] 3,789,279
[45] Jan. 29, 1974

[54] WORK AND FEED CONTROL SYSTEM FOR CUTTING MACHINES

[75] Inventors: Edward Justing Dempsey, Huntington Beach; David Earl Kent; Patrick William Hudspeth, both of La Mirada, all of Calif.

[73] Assignee: Concrete Cutting Equipment, Incorporated, Hawthorne, Calif.

[22] Filed: July 21, 1972

[21] Appl. No.: 273,685

[52] U.S. Cl. .................. 318/39, 318/599, 318/571, 318/681
[51] Int. Cl. .......................................... G05b 19/24
[58] Field of Search ...... 318/39, 345, 599, 571, 681

[56] References Cited
UNITED STATES PATENTS

| | | | |
|---|---|---|---|
| 2,411,162 | 11/1946 | King | 318/39 |
| 1,989,187 | 1/1935 | Fitzgerald | 318/39 X |
| 3,259,023 | 7/1966 | Rieger et al. | 318/39 UX |
| 3,224,338 | 12/1965 | Reynolds | 318/39 X |
| 2,525,479 | 10/1950 | Cunningham | 318/39 |
| 3,402,338 | 9/1968 | Thoresen | 318/345 X |

*Primary Examiner*—T. E. Lynch
*Attorney, Agent, or Firm*—Lindenberg, Freilich & Wasserman

[57] ABSTRACT

A control system for cutting machines is disclosed in which a desired load is maintained on the cutting motor by use of a servo system regulating power to a feed motor which produces relative motion between the cutting tool and the work. The input to the servo system is a load-level signal proportional to the load current to the cutting motor. That signal is derived by adding signals from current transformers on the power lines to the cutting motor. If the load-level signal exceeds a predetermined threshold, the feed motor is reversed and the servo system is forced to a full speed level. Once the overload condition is relieved, the feed motor is restored to forward drive, but the servo system is limited to a low level for a predetermined period to assure feeding into the work slowly.

9 Claims, 7 Drawing Figures

WORK AND FEED CONTROL SYSTEM FOR CUTTING MACHINES

BACKGROUND OF THE INVENTION

This invention relates to control systems for cutting machines and more particularly to servo control systems.

In machine tools having automatic feed systems for sawing, drilling or machining materials, continuous physical effort is required from an operator to monitor the machine tool and manually override the automatic feed system as required to avoid an overload condition. It is not completely satisfactory to provide a fuse, not only because time is lost in replacing or resetting the fuse, but also because in the time the fuse is heating, some latent damage may be caused.

Experience has shown that an operator becomes less attentive, and less efficient, as a working day progresses due to the physical effort required in monitoring the machine tool. It would be desirable to have a servo control system for automatic feed to maintain the load on the cutting machine motor substantially constant. While such a servo will provide a more efficient cutting operation and relieve the operator of much of the physical effort otherwise required in monitoring the cutting machine, some attention of the operator is required continuously to guard against some unexpected condition that may produce an overload.

Concrete cutting machines are prime examples of systems which may be overloaded due to an unexpected condition. This is so because concrete is not homogenous. Gravel is usually included with rocks of different size and hardness. Also reinforcing iron rods or other metal objects are often encountered. Accordingly, even though a servo system is included to maintain the load on the cutting motor constant, it is possible for the cutting motor to be overloaded, as when the cutting tool becomes unexpectedly jammed against a metal object. To guard against such an unexpected overload condition without risk of damage to the cutting motor, something more than a thermal fuse is required to relieve the operator of the need for any more attention than is required to monitor the progress of the cutting machine.

SUMMARY OF THE INVENTION

In a cutting machine having a feed motor for producing relative motion between a cutting tool and material to be cut, and a motor for driving the cutting tool, a load-control servo system is provided comprised of means for detecting the level of current to the cutting motor, means for comparing that current level with a reference level to produce an error signal, means responsive to the error signal for pulse-width modulating pulses inversely proportional to the error, and means responsive to the pulse-width modulated pulses for gating electrical power to the feed motor from alternating line current thereby so driving the feed motor forward as to maintain the load on the cutting motor constant. The output from the means for detecting the level of current to the cutting motor is also applied to a threshold detecting means which detects when the current to the cutting motor exceeds a predetermined threshold level and produces an overload signal. The overload signal actuates means for reversing the direction of the feed motor to drive the cutting tool away from the material. The overload signal also actuates means for driving the error signal from the load comparing means to a level for a predetermined maximum pulse width modulation, thereby applying full reverse power to the feed motor. The servo error signal is thus quickly driven toward zero to deactivate the reversing means. In order that the feed motor not be driven at a high speed forward after a reversing cycle, the overload signal actuates means for delaying operation of the feed motor at high speed for a predetermined period after a detected overload condition is terminated. This is accomplished by limiting the error signal to a predetermined low level for a predetermined period after the overload signal terminates.

The novel features of the invention are set forth with particularity in the appended claims. The invention will best be understood from the following description when read in conjunction with the accompanying drawings.

DESCRIPTION OF PREFERRED EMBODIMENTS

Figure 1:
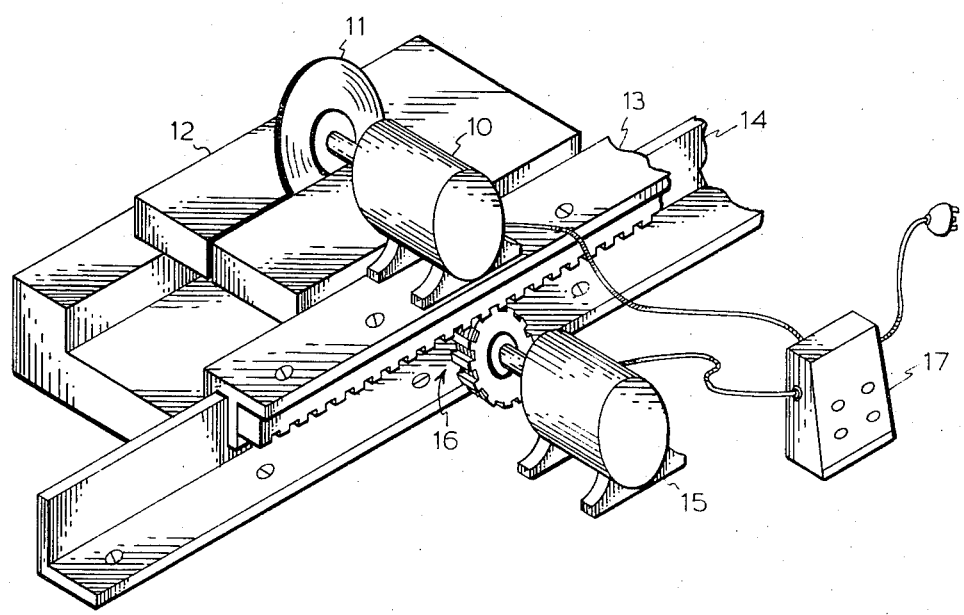
FIG. 1 is an exemplary cutting machine to which the present invention relates.

Referring to FIG. 1, a concrete cutting system is shown by way of example. A cutting motor 10 drives a blade 11 to saw through a sheet 12 of concrete. The motor is mounted on a carriage 13 which rides on a rail 14. A feed motor 15 moves the carriage along the rail through a rack and pinion assembly 16 as shown. A control box 17 provides AC current (preferably 3-phase as shown) to the cutting motor 10 (preferably an induction motor) and DC current to the feed motor 15 (preferably a series wound motor). The DC current is obtained by rectifying current from two of the three phases of current from a power generator (not shown) which generates 3-phase current at 400 Hz, for example, or any other frequency such as the more conventional line current at 60 Hz. Reference will be made hereinafter to 400 Hz to describe a specific embodiment, and not to imply any frequency limitation.

The control box includes a load-control servo system to regulate the load on the cutting motor 10 by control of the feed motor 15. Control knobs on the front panel of the control box permits an operator to set the desired load level. The servo system then maintains this load for optimum cutting and automatically corrects the cutting rate as conditions change. If the saw blade should encounter harder material, load current to the motor 10 will tend to increase. A load detector 20 shown in FIG. 2 detects the increased current to the motor and causes the servo system to decrease the current to the feed motor, thus maintaining a constant load on the cutting motor.

If for any reason the blade 11 should tend to stall, the cutting motor will begin to draw excessive current. This is detected by the load detector 20, and when a predetermined threshold level is reached, that condition is detected by a threshold level detector 21 (FIG. 2) to reverse the direction of the drive motor 15 at full speed. That will pull the saw blade out of the work. Once this is done, the 3-phase current to the cutting motor drops and the direction of the drive motor is again forward. As will be described more fully hereinafter, the feed motor is driven in the forward direction at a limited speed for a predetermined period after an overload condition has reversed its direction. This is to avoid slamming the blade into the work.

Figure 2:
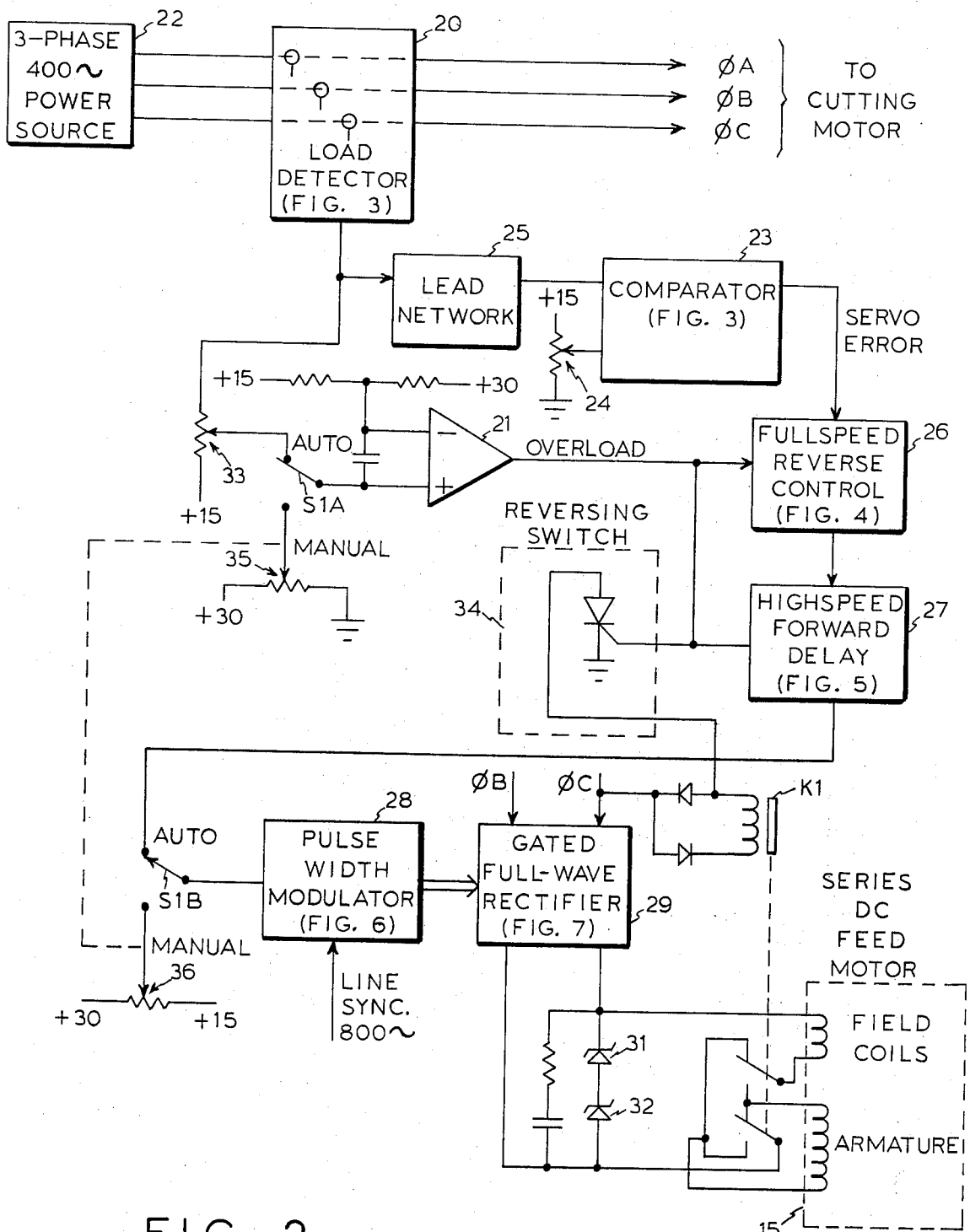
FIG. 2 is a functional block diagram of a preferred embodiment of the present invention.

Before describing a preferred embodiment of the invention further with reference to FIG. 2, and the remaining figures, it should be noted that the motion of the cutting motor over the stationary work is arbitrary; the cutting motor could be held stationary and the work driven into the cutting blade by a carriage driven by the feed motor. It should also be noted that the present invention can be adapted to a machine for drilling holes, or for turning a work piece on a lathe, as when a rough cut is to be made prior to final or precision turning, at which time turning with a constant surface feed is preferred. In any case, for use of the present invention to advantage in any cutting operation, it is simply necessary to use a feed motor to produce relative motion between a cutter and the work, and another motor to produce relative cutting motion between the cutter and the work. For simplicity, only a concrete cutting machine is illustrated in which the cutting motor is moved to feed the saw blade into the work. Such a machine can be set up to cut an opening, such as a door, in a concrete wall or slab.

Referring now to FIG. 2, an exemplary embodiment of the control box 17 is shown for 3-phase power at 400 Hz from a source 22. This power is fed to the cutting motor through the load detector 20 which produces a DC voltage proportional to the average current of the three phases of current to the cutting motor. This load current level is compared in a comparator 23 with a reference level set by a potentiometer 24. The difference is transmitted by the comparator 23 as a servo error signal.

Mechanical lags in the feed motor and the inertia of the saw assembly are compensated electronically by a lead network 25. Failure to provide such compensation may result in an unstable servo loop. Techniques for computing the lag to be compensated are known to those skilled in the art and will therefore not be described here.

The servo error signal is fed through a full-speed-reverse control unit 26 and a high-speed-forward delay unit 27 to a pulse width modulator 28. There pulses generated at the rate of 800 Hz are modulated in width inversely proportional to the error signal level. These pulses are used to gate two phases (0B and 0C) from the power source through a full-wave rectifier 29 to the field coils and armature of the feed motor 15. Zener diodes 31 and 32 protect the gated rectifier 29 from excessive voltage transients. In that manner the speed of the feed motor is automatically controlled to maintain the load of the cutting motor constant at the level set by the potentiometer 24.

The DC voltage from the load detector 20, the load-level signal, is also transmitted to the threshold level detector 21 for detecting any load condition over a predetermined level set by a potentiometer 33. This reference level could be adjusted by varying the input voltage to the inverting (−) input terminal of the detector 21, but it is preferred to provide a fixed voltage at that input as shown and adjust the potentiometer 33 instead. This has the effect of multiplying the load-level signal by an adjusting factor. With the reference fixed, the level of load which will be detected as an overload condition can be set at any level without requiring any adjustments within the threshold detector 21, which is essentially saturation type differential amplifier used as a comparator.

An overload signal from the detector is transmitted at a fixed level until the overload condition is corrected, at which time the output of the detector returns to a low level. This overload signal, essentially a square wave, trips the full-speed-reverse control unit 26, the high-speed-forward delay unit 27 and a reversing SCR switch 34. The latter energizes a relay K1 to reverse the motor 15 by reversing the polarity of the voltage applied to the armature of the motor. Meantime, the unit 26 drives the servo error signal to a predetermined level which produces full speed for pulling the cutter (saw blade) out of the work quickly. Once the overload condition is thus relieved, the reversing switch 34 is opened (cut off) to deenergize the relay K1 and restore the connections to the feed motor for forward drive.

At the same time that forward drive is restored, the unit 26 is deactivated to restore the error signal to its normal level. This normal level is apt to cause the motor to feed the cutter at such a high rate initially that the cutter could slam into the work, thus creating another overload condition. To avoid that, the unit 27 delays high speed error signals from being transmitted to the modulator for a brief period of about 12 seconds by limiting the amplitude of the error signal from the control unit 26 to a predetermined level which will assure slow restoration of normal load.

Ganged switches S1-A and S1-B permit the control system to be operated manually. By operating ganged potentiometers 35 and 36, the operator can operate the feed motor manually for positioning the saw to start the cut or to otherwise move the saw.

An exemplary circuit for deriving the servo error signal will now be described with reference to FIG. 3. Three current transformers T1, T2 and T3 are used to monitor the three phases of current to the cutting motor. Each transformer is comprised of a toroid of mangetically permeable material through which a single line passes as a primary winding. The secondary windings of the three transformers are connected in parallel between a source of reference potential (+15 volts) and, through rectifying diodes, to a summing junction J1. A capacitor C1 filters the load-level signal thus developed across a potentiometer 40. That potentiometer is used for scale adjustment in the system. The net result is a DC load-level signal proportional to the average current of the three 400 Hz power lines.

This load-level signal is effectively compared with a reference set through the potentiometer 24 to produce a positive error signal at a junction J2 between for example, +15 and +20 volts. An operational amplifier 41 is used in a conventional configuration to amplify the signal and set the loop gain. A potentiometer 42 is used to adjust the comparator for a "zero" error signal of about +20 volts when the load is at the desired level, and a potentiometer 44 is used to adjust the servo loop gain. The maximum error signal for too low a load level is about +15 volts.

Figure 3:
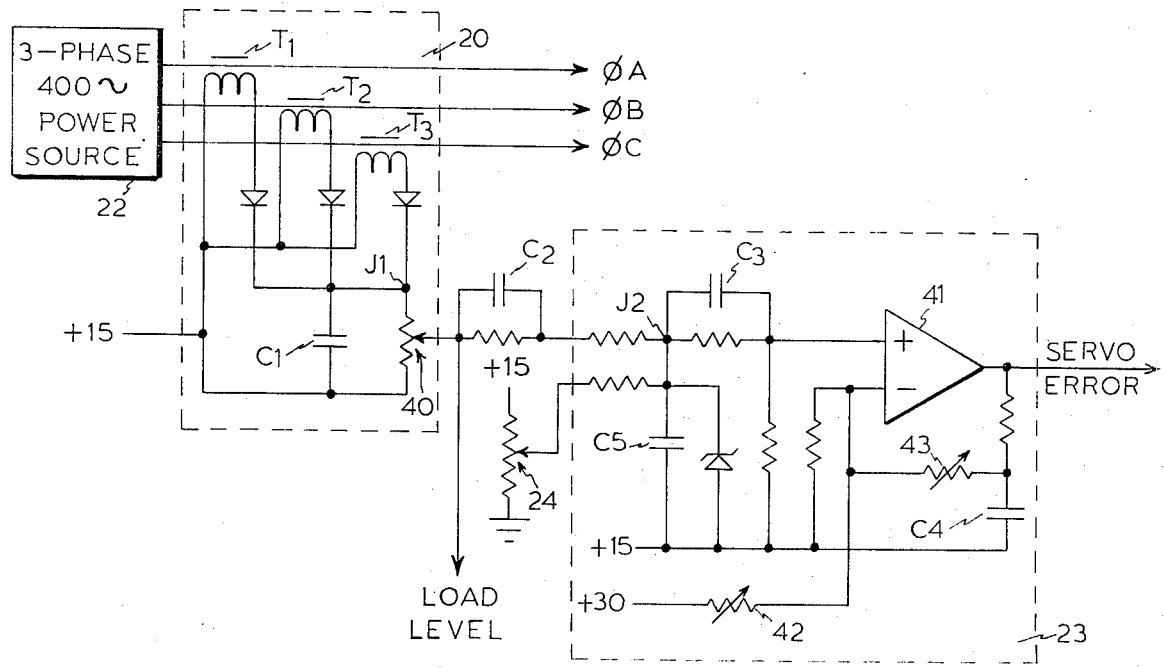
FIG. 3 is a circuit diagram of a load detector, lead network and passive comparator for the system of FIG. 2.

The lead network 25 shown in FIG. 2 is comprised of capacitors C2, C3 and C4 shown in FIG. 3. Capacitor C5 provides proper roll-off in the frequency response of the comparator 23 to filter out noise above the maximum frequency of interest.

Figure 4:
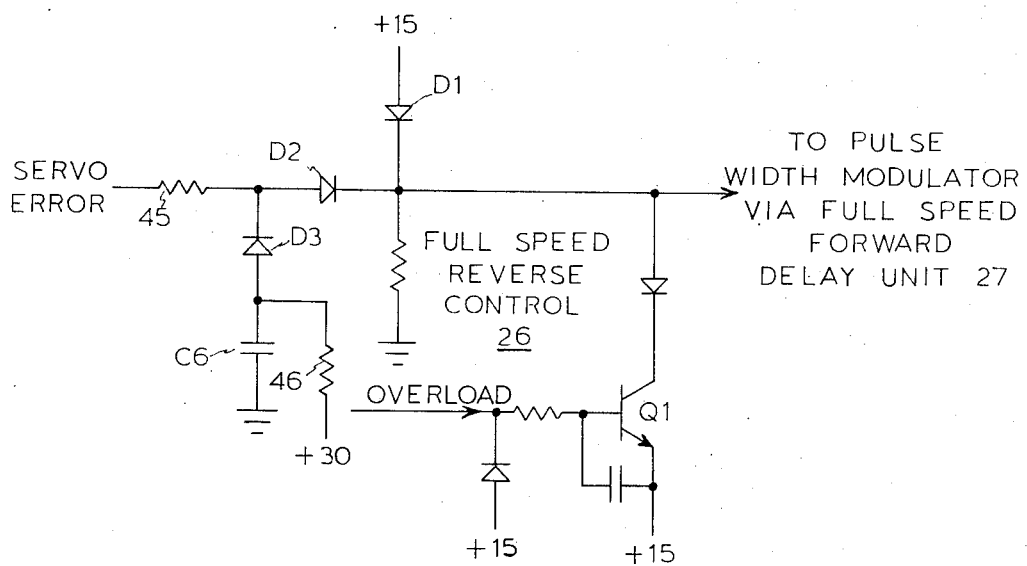
FIG. 4 is a circuit diagram of a full speed, reverse control means for the system of FIG. 2.

The control unit 26 for full speed reverse is shown in FIG. 4. It receives the servo error signal from the comparator 24. Since that error signal is always between about +15 and +20 volts, the pulse width modulator 28 is set for 100 percent pulse width modulation for an error signal of +15 volts and zero pulse width modulation for an error signal of +20 volts. To assure that the error signal does not go below +15 volts for pulse width modulation above 100 percent, a diode D1 provides clamping. A capacitor C6, diode D3 and resistors 45 and 46 form a circuit which limits the rate of change of the error signal to the drive motor to a value proportional to approximately the RC time constant of the resistor 45 and the capacitor C6. In that manner this RC circuit prevents surging. For an increase of less than 10 percent, this RC circuit has no affect due to the voltage drop across the diode D3 of about 0.6V, and due to the unidirectional conduction of the diode D3, the reverse control unit will not limit the rate at which the feed motor is stopped but will limit the forward speed rate of change.

As soon as an overload condition is detected, the reversing SCR switch 34 (FIG. 2) is turned on to reverse the drive direction of the feed motor 15, as noted hereinbefore. At this time maximum (100 percent) pulse width modulation is desired to drive the feed motor at full speed in reverse, but the error signal is then +20 volts. To clamp the error signal at +15 volts for the duration of the overload condition, a transistor Q1 (FIG. 4) is turned on by the overload signal of the detector 21. That clamps the error signal transmitted to the pulse width modulator via the high-speed-forward delay unit 27.

Figure 5:
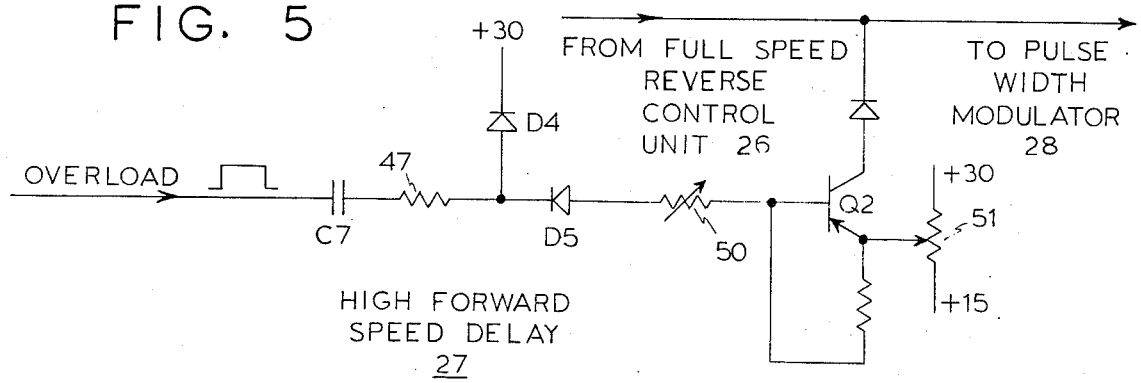
FIG. 5 is a circuit diagram of means for high speed forward delay in the system of FIG. 2 after a reverse control cycle.

The function of the delay unit 27 shown in FIG. 5 is to prevent the servo control system from achieving high speed forward a limited time after it has been reversed by an overload condition. Once the overload condition is relieved, the transistor Q1 (FIG. 4) is turned off, but the error signal from the comparator 23 will likely be at or near +15 volts since driving the feed motor at full speed in reverse will back the saw blade from the work enough for the load on the cutting motor to drop below the desired level. To permit high speed forward under those conditions could result in again overloading the cutting motor when it suddenly picks up the work. The manner in which the delay unit prevents that is as follows. The overload signal is a positive step voltage rising from zero to +30 volts. It therefore discharges a capacitor C7 through a resistor 47 and diode D4 during the overload condition. When the overload condition is relieved, the output of the overload detector 21 returns to zero, thus recharging capacitor C7 through a diode D5 and potentiometer 50, thereby providing a source of negative potential on the base a PNP transistor Q2. That transistor then turns on for an RC time set by a potentiometer 50. That time is preferably set for about 12 seconds in a concrete cutting machine. During that time, the transistor Q2 conducts to clamp the servo error signal, limiting it to a maximum of 15 percent pulse width modulation, i.e., at a level of about +19.25 volts minimum set by a potentiometer 51. When the capacitor C7 has discharged sufficiently to turn off the transistor Q2, the servo control will return to normal. The pulse width modulator 28 (FIG. 2) responds to the error signal, clamped (for full speed reverse or 15 percent speed forward) or unclamped (for normal operation), to produce pulses of appropriate width to the gated full-wave rectifier 29.

Figure 6:
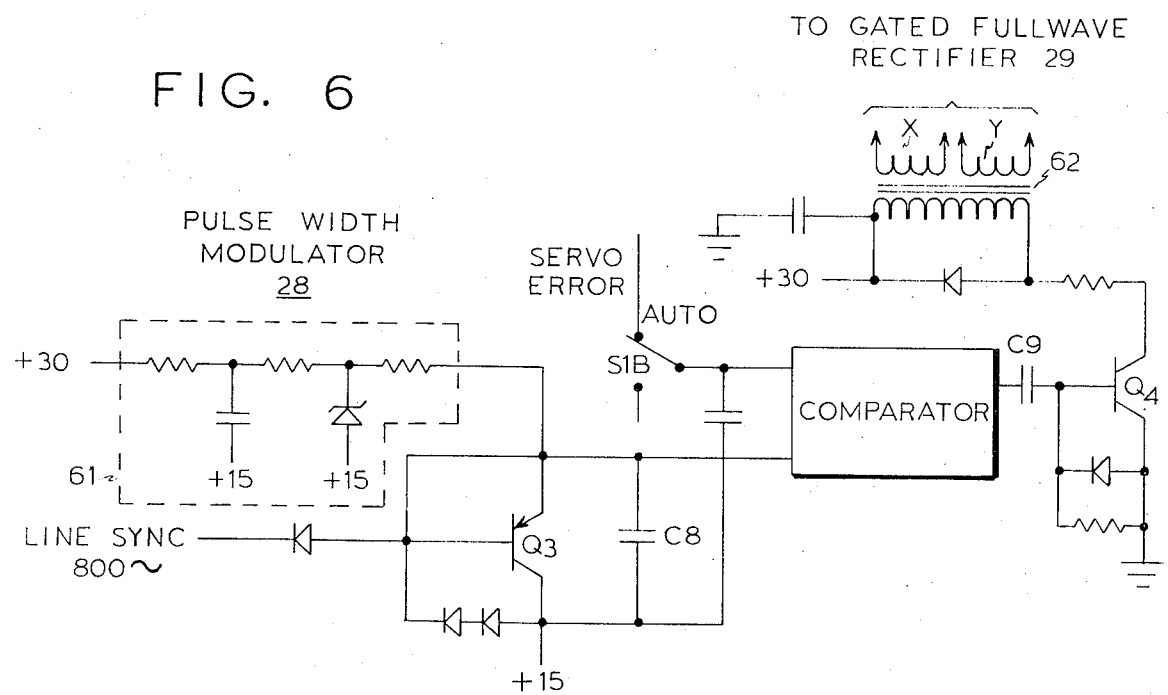
FIG. 6 is a circuit diagram of a pulse width modulator for the system of FIG. 2.

The pulse width modulator will now be described with reference to FIG. 6. It is comprised of a sawtooth waveform generator and a comparator 60. The sawtooth generator consists of a capacitor C8 which is charged from a current source 61. At the end of each half cycle of the time current, which is at the rate of 800 Hz, a transistor Q3 is momentarily turned on to quickly discharge the capacitor C8. The "line sync" signal used for this purpose may be obtained by a full-wave rectifier connected across two power lines. The comparator 60, a saturation type differential amplifier produces a pulse for the entire period of each sawtooth cycle that the sawtooth waveform exceeds the servo error signal, thus producing the desired pulse width modulation. The output pulses from the comparator 60 are differentiated by a capacitor C9 and amplified by a transistor Q4 connected to the primary winding of a pulse transformer 62 having two secondary winding X and Y.

Figure 7:
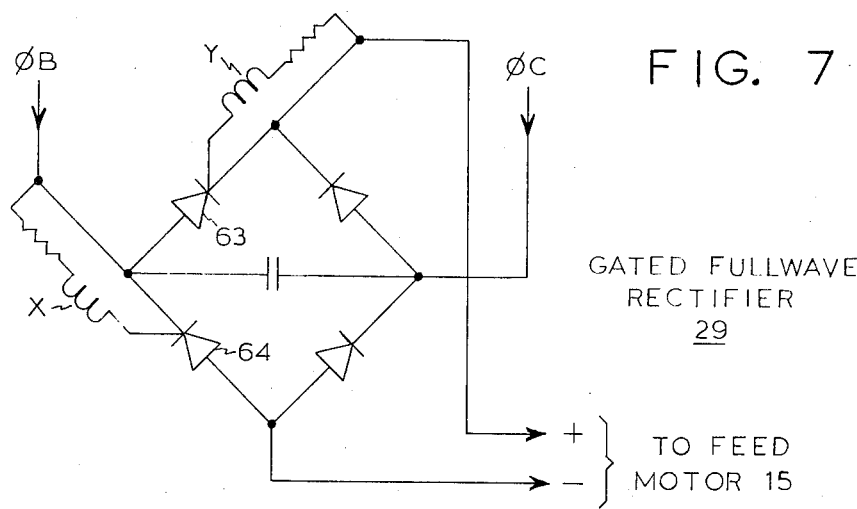
FIG. 7 is a circuit diagram of a gated full-wave rectifier for the system of FIG. 2.

These secondary windings are connected to silicon controlled rectifiers 63 and 64 shown in FIG. 7. The rectifiers are connected in a bridge-type rectifier to provide a gated full-wave rectifier. In that manner the power to the feed motor is controlled by turning on the full-wave rectifier for a period during each half cycle of the line current indicated by the level of the servo error signal.

What is claimed is:

1. In a machine having two motors for cutting material, a feed motor for producing relative motion between a cutting tool and material being cut at a rate proportional to electrical power applied, thereby feeding material to said cutting tool, and a cutting motor for producing a cutting motion of said tool at a rate proportional to the level of current to said cutting motor, which level is in turn proportional to the load on said cutting tool, a load-control servo system comprised of
means for continuously detecting said level of current to said cutting motor,
means for continuously comparing said level of current to said cutting motor with a reference level and for producing an error signal proportional to the difference between said level of current and said reference level, where said reference level is set for a desired cutting tool load,
means responsive to said error signal for controlling said electrical power applied to said feed motor to maintain the load on said cutting motor constant,
means for detecting when current to said cutting motor exceeds a predetermined threshold level and for producing an overload signal when that condition is detected, and
means responsive to said overload signal for reversing the direction of drive of said feed motor to reverse relative motion between said cutting tool and said material being cut.

2. The combination of claim 1 including means responsive to said overload signal for applying maximum power to said feed motor, thereby applying full reverse power to said feed motor during an overload condition.

3. The combination of claim 2 including means responsive to said overload signal for delaying operation of said feed motor at high speed after a detected overload condition is terminated for a predetermined period after said overload signal terminates.

4. The combination of claim 3 wherein said high-speed delaying means includes means which responds to said overload signal for limiting said error signal to said controlling means to a predetermined low level for said predetermined period.

5. The combination of claim 4 wherein said means responsive to said error signal for controlling said electrical power applied to said feed motor is comprised of
means for pulse-width modulating pulses inversely proportional to said error signal amplitude,
means for applying said pulses at a constant rate to said modulating means, and
means responsive to pulse-width modulated pulses from said modulating means for gating electrical power to said feed motor.

6. The combination of claim 5 wherein said feed motor is a series DC motor and said gating means is a gated full-wave rectifying means for receiving alternating line current and delivering DC current to said feed motor.

7. The combination of claim 6 wherein said reversing means is comprised of relay switching means responsive to said overload signal for reversing connections from said gated full-wave rectifying means to said series DC motor.

8. The combination of claim 7 wherein said means responsive to said overload signal for applying maximum power to said feed motor includes means for limiting only the rate of change of forward speed of said feed motor to prevent surging in the forward direction without limiting the rate at which said feed motor is reversed.

9. The combination of claim 8 wherein said means responsive to said overload signal for limiting said error signal to a predetermeined low level for said predetermined period is comprised of
an RC timing means set to start timing said predetermined period by charging a capacitor in response to said overload signal and allowing said capacitor to discharge through a resistor when said overload signal terminates, and
means coupled to said RC timing means by unidirectional conducting means for conducting discharge current from said capacitor, and in response to said discharge current for clamping said error signal to a predetermined low level until said capacitor discharges sufficiently to be unable to maintain discharge current through said unidirectional conducting means.

* * * * *